M. H. ROBERTS AND C. C. VAN NUYS.
ELECTRIC WELDING.
APPLICATION FILED FEB. 4, 1919.
1,309,696.
Patented July 15, 1919.
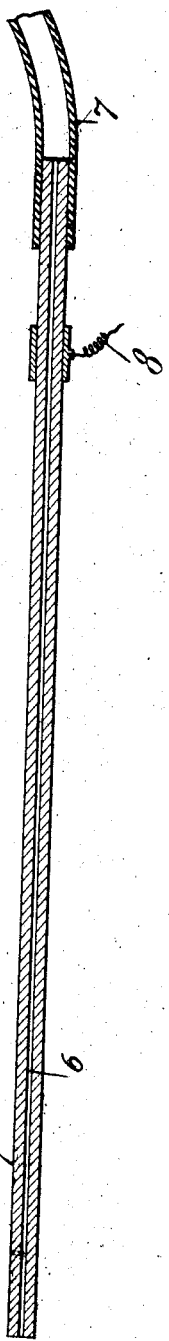
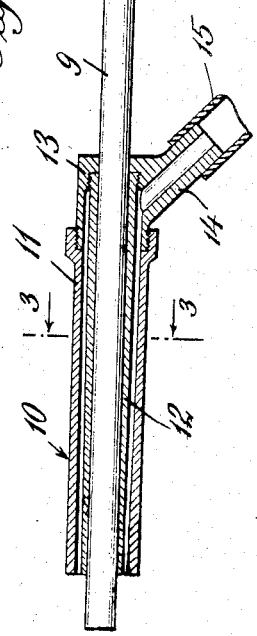
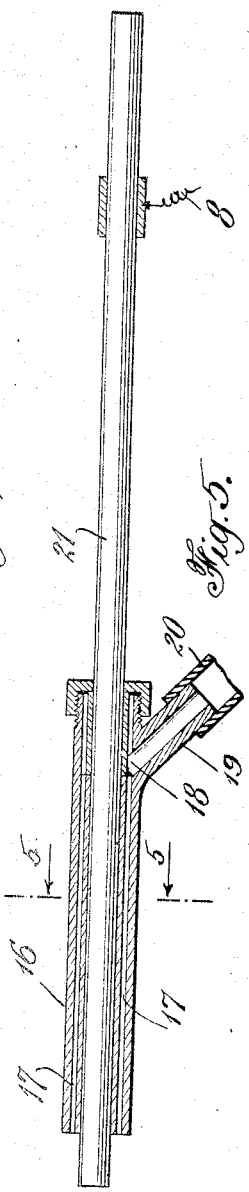
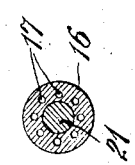
INVENTORS
Montague H. Roberts and
Claude C. Van Nuys
BY
Pennie Davis Marvin & Edmonds
their ATTORNEYS

UNITED STATES PATENT OFFICE.

MONTAGUE H. ROBERTS, OF JERSEY CITY, NEW JERSEY, AND CLAUDE C. VAN NUYS, OF NEW YORK, N. Y., ASSIGNORS TO AIR REDUCTION COMPANY, INC., A CORPORATION OF NEW YORK.

ELECTRIC WELDING.

1,309,696.  Specification of Letters Patent.  Patented July 15, 1919.

Application filed February 4, 1919. Serial No. 274,927.

*To all whom it may concern:*

Be it known that we, MONTAGUE H. ROBERTS and CLAUDE C. VAN NUYS, residing at Jersey City, county of Hudson, State of New Jersey, and New York city, county of New York, State of New York, respectively, have invented certain new and useful Improvements in Electric Welding; and we do hereby declare the following to be a full, clear, and exact description of the invention, such as will enable others skilled in the art to which it appertains to make and use the same.

This invention relates to electric arc welding operations, its object being to improve the character of the weld produced with the aid of the electric arc, by excluding atmospheric oxygen which, as experience has disclosed, forms oxides with the metal, segregating in and weakening the weld.

Further objects and advantages of our invention will be apparent as it is better understood, by reference to the following specification when read in connection with the accompanying drawing, illustrating suitable means adapted to be employed in carrying out our invention.

In the drawing Figure 1 is a longitudinal section through an electrode.

Fig. 2 is a longitudinal section through a slightly different structure in which the electrode is supported in a holder.

Fig. 3 is a section on the line 3—3.

Fig. 4 is a longitudinal section through another structure capable of use in carrying out our invention and Fig. 5 is a section on the line 5—5 of Fig. 4.

Electric arc welding operations are necessarily carried on at the relatively high temperature of the arc and at this temperature the metal welded is peculiarly susceptible to combination with atmospheric oxygen, which combines with the metal forming oxids. These oxids are disseminated through the metal while it is in molten condition, but on cooling the metal crystallizes and the oxids are segregated and appear at the grain boundaries. This action results in an accumulation of oxids in a zone extending through the work and generally medially disposed in the weld. Obviously this zone of the weld is relatively weak and readily gives way upon the application of force to the work. Practical operations followed by close examination has demonstrated that fracture in the weld always occurs along the grain boundaries which are filled with oxids. As a result, welds made by the electric arc method, as heretofore conducted, are frequently faulty to an extent which seriously impairs the usefulness of an otherwise decidedly advantageous method of welding.

We have discovered that the disadvantages due to oxidation in the weld may be entirely overcome by conducting the welding operation under conditions which exclude all, or at least a major portion, of the normal atmospheric oxygen. This may be accomplished in a variety of ways, but we find it to be particularly advantageous to deliver a stream of non-oxidizing and preferably relatively inexpensive gaseous medium, such, for example, as nitrogen, upon and about the weld. Nitrogen is preferably used because of its inert chemical character and because it may be obtained in quantity at relatively low cost. Other non-oxidizing gases may, however, be successfully substituted for nitrogen and our method is not limited to the use of nitrogen.

The gaseous medium may be maintained in a suitable housing surrounding the work, but as this would interfere more or less with the manipulation of the operator, we prefer to provide a jet or number of jets supplying a blast of the gaseous medium which plays continuously on the work throughout the operation. A sufficient volume of the gaseous medium is employed to maintain an atmosphere thereof which surrounds the heated part of the work and effectually excludes atmospheric oxygen. Preferably the gaseous medium employed is in a thoroughly anhydrous condition to prevent oxidation by oxygen released through decomposition of moisture in the arc.

In the drawing we have illustrated several means for carrying our invention into effective operation. In Fig. 1 such means comprises an electrode 5, preferably of metal, corresponding somewhat closely in composition to the metal to be welded, though other metal or carbon may be employed, this being a detail of the electric arc welding operation which forms no part of our present invention. The electrode 5 is provided with a longitudinal duct or bore 6, and a flexible conductor or hose 7 is secured to the end of the electrode and connected to a suitable source of a gaseous medium, such as nitrogen, under pressure. The electrode 5 is connected by a conductor 8 to a source of current, so that an arc may be struck in the customary manner and the work thereby heated. Throughout the operation the gaseous medium is delivered through the duct or bore 6 and issuing through the end of the electrode blankets the work and effectually prevents access of oxygen thereto. Thus the formation of oxids by combination of the metal with atmospheric oxygen becomes impossible and the weld produced is found to be free from oxids. No segregation of oxids in the grain boundaries in the weld, being possible, the maximum strength is assured and failures at the weld seldom or never occur.

In Figs. 2 and 3 of the drawing we have illustrated a slightly different form of apparatus in which a solid electrode 9 is supported in a holder 10 comprising two tubes 11 and 12 concentrically arranged and supported in a suitable head, 13, having an inlet 14 adapted to be connected by a hose 15 to a source of the gaseous medium under pressure. The gaseous medium issues from the annular space surrounding the end of the electrode and maintains an inert atmosphere about the heated portion of the work as hereinbefore described. As the electrode is consumed, it must be moved from time to time, relatively to the holder, in order to maintain substantially the same distance between the work and the outlet for the gaseous medium.

In Figs. 4 and 5 still another form of device is illustrated in which the holder 16 is provided with a plurality of longitudinal ducts 17 terminating in a chamber 18 to which the gaseous medium is fed through an inlet 19 and hose 20 from a suitable source under pressure. The electrode 21 must be moved relatively to the holder, from time to time, as the former is consumed. The gaseous medium issuing from the ducts 17 applies an inert blanket to the heated portions of the work exactly as in the previously described embodiments.

It is to be understood that numerous variations of the means for accomplishing the desired object may be employed and that we do not wish to be limited to any specific apparatus for carrying out our invention which contemplates broadly the idea of carrying out the electric arc welding operation in an atmosphere from which oxygen is substantially excluded.

Various changes and modifications may therefore be made, within the scope of the appended claims, without departing from the invention or sacrificing any of its material advantages.

We claim:

1. A method of improving the character of welds produced by the electric arc process which comprises blanketing the heated parts of the work during the welding operation with nitrogen and thereby excluding atmospheric oxygen.

2. A method of improving the character of welds produced by the electric arc process which comprises blanketing the heated parts of the work during the welding operation with an inert gaseous medium and thereby excluding atmospheric oxygen.

3. A method of improving the character of welds produced by the electric arc process which comprises surrounding the heated parts of the work during the welding operation with an atmosphere substantially consisting of dry nitrogen.

4. A method of carrying out an electric welding operation to produce a weld substantially free from oxids, which comprises heating the work with an electric arc and directing a stream of an inert gaseous medium upon the heated portion of the work.

5. A method of carrying out an electric welding operation to produce a weld substantially free from oxids, which comprises heating the work with an electric arc and directing a stream of a dry inert gaseous medium upon the heated portion of the work.

6. A method of carrying out an electric welding operation to produce a weld substantially free from oxids, which comprises heating the work with an electric arc and directing a stream of nitrogen upon the heated portion of the work.

In testimony whereof we affix our signatures.

MONTAGUE H. ROBERTS.
CLAUDE C. VAN NUYS.